July 22, 1969  S. R. BARNETTE  3,457,133
SOLID STONE APPEARING CAST PLASTIC ARTICLES WITH
A PARTIALLY ENVELOPED STRUCTURAL CORE
Original Filed Jan. 14, 1963

INVENTOR:
Stanley Ronald Barnette

United States Patent Office 3,457,133
Patented July 22, 1969

---

3,457,133
SOLID STONE APPEARING CAST PLASTIC ARTICLES WITH A PARTIALLY ENVELOPED STRUCTURAL CORE
Stanley Ronald Barnette, 90 Cherokee St., Miami Springs, Fla. 33166
Continuation of application Ser. No. 251,432, Jan. 14, 1963. This application June 15, 1967, Ser. No. 646,435
The portion of the term of the patent subsequent to Jan. 17, 1984, has been disclaimed
Int. Cl. D21c 9/00; B32b 17/08
U.S. Cl. 161—5                                16 Claims

ABSTRACT OF THE DISCLOSURE

A cast plastic stone appearing rigid structural surfacing ornamental slab comprising at least one lightweight partially surrounded core and a core masking cast plastic solid stone appearing body self-bonded to said core in a unitary seamless construction, on a face and edge portions, said core providing structure and bulk rigidity to said structural surfacing slab, said core occupying a substantial volume of said surfacing slab and comprising an upper masked core surface, a lower completely exposed core surface defining at least a portion of one exterior face of said surfacing slab and a completely masked contour edge, said cast plastic body comprising at least one layer of a substantially rigid-forming mixture of plastic material.

---

This application is a continuation of Ser. No. 251,432, filed Jan. 14, 1963, now abandoned, which is a continuation in part of Ser. No. 808,599, filed Apr. 24, 1959, now Patent No. 3,072,973.

This invention relates to a process for producing plastic articles, namely, structural panels, table tops, flooring, roofing, furniture, window sills, walls, etc., having a structural core partially enveloped in said plastic.

Another object of this invention is to provide structural cores readily shaped so as to be interlocked into the plastic body of the article that surrounds said core.

It is another object of this invention to produce articles having a plastic body self-bonded and interlocked to the core, having a unitary, integral and seamless plastic edge, with any desired exterior surface finish and having a deep three-dimensional decorative effect visible through the plastic, said structural core providing rigidity, lightweightedness, acoustical properties, shock-proof properties, insulation properties, etc.

Finally this invention relates to articles of manufacture in the form of a slab comprising a plastic body partially enveloping a structural core, produced by the methods herein disclosed.

In accordance wtih these and other objects which will become apparent hereinafter, the instant invention will now be described with reference to the accompanying drawings illustrating a preferred embodiment thereof.

Figure 19:
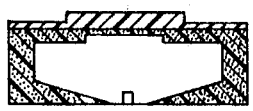
Figure 9:
FIGURE 9 is a cross-sectional view of an article produced according to this invention.

FIGURES 20–24 are cross-sectional views of the steps involved in order to produce an article with at least one finished surface; and FIGURE 25 is a cross-sectional view of the article produced by means of the steps depicted in FIGURES 20–24 which corresponds to FIGURE 9 but in a similar position to FIGURE 19 in duplicating the face and contour of the mold assembly. Different shapes and/or different surfaces may be used.

With reference to the drawings, the instant invention will now be described with reference to an example.

Figure 1:
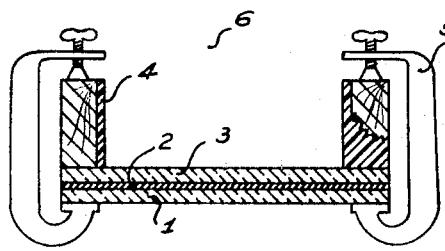
FIGURES 1 and 2 are cross-sectional views of molds that may be employed in the practice of this invention.

FIGURE 1 depicts a mold assembly comprising a leveled platform 1, a metal foil blanket 2, a mold base 3 and mold walls 4. The mold walls and mold base are tightly secured by means of clamps 5 to form the open mold 6. The open mold 6 in some instances may be replaced by a one section cavity mold illustrated in FIGURE 2, whenever standard sizes are manufactured.

The simple mold forms illustrated at 4 of FIGURE 1 are of the melamine (formica covered plywood) type as they can be very readily shaped to provide the desired side walls contours of the mold.

The mold base 3 indicated in FIGURE 1, is a glass or melamine type, and a releasing compound for the mold base and mold walls must be used. In the event that a polyester film is used to form the mold base and or the mold walls, no coating is necessary as this material in itself acts as a ready release.

Figure 2:
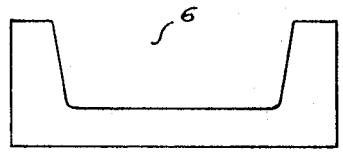

The one section cavity mold illustrated in FIGURE 2 includes rubber, metal, glass or plastic material and in the case of rigid materials, the mold walls will form with the mold base an angle over 90° to permit the removal of the article from the mold.

Figure 3:
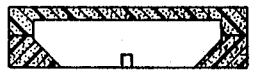
FIGURES 3 through 8 are cross-sectional views of the basic steps to partially envelop a core.

Referring to FIGURE 3 an example of an article produced by this method will be illustrated step by step through the succeeding illustrations, consisting in a 48" diameter table top.

Figure 4:
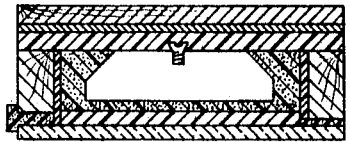

A ¾" thick structural core 7 as in FIGURE 3 having a desired contour at the edge 8 consisting of a chamfer and slightly narrower than the mold rim 4, is centered and laid on the mold base 3 into the open top mold 6 to form a predetermined cavity 9 limited by the edge of said core and the corresponding sections of the mold. As soon as the core is centered and positioned in the mold, means are provided to keep said core in close contact with the mold base and centered therein. Such means may consist of an upper bar 10 as indicated in FIGURE 4 or one screw 11 illustrated in FIGURE 5 secured to the bottom of the core through a machined hole 12 in the mold base 3, said means removable at any desired step of the operation and the choice of one or any other system being of no consequence.

In order to partially envelop the core two different procedures may be followed which are illustrated in FIGURES 6 through 9.

For the example of the 48" diameter table top a mixture is prepared consisting of: 4 quarts of polyester resin, ⅓ quart of styrene, 1 dram of cobalt naphthenate (6% cobalt) and 3 ounces of black polyester paste. As may be seen in connection wtih the dimensions given at the beginning of this example (a 48" diameter table top using a ¾" thick structural core slightly smaller than the mold) and from the proportions of resin, as well as similar information appearing in said earlier copending application Ser. No. 808,599, over which this is an improvement, the volume of bulk of the core is substantial in relation to the volume or bulk of the resin.

Figure 6:

In the first procedure the partial envelopment is accomplished in two steps:

One half of the mixture is placed in a separate container and mixed with 1% of methyl ethyl ketone peroxide (60%), stirred and poured into the cavity or on top of the core, so that the catalyzed mixture 13 as depicted in FIGURE 6 rises to a partial depth of the mold and permeates a portion of the edges of the core.

Figure 7:

After this first layer hardens to a certain degree the remaining half of the mixture is mixed with 1% methyl ethyl ketone peroxide (60%), stirred and poured on top of the first layer 13 and leveled to the edges, completely covering the edges and top surface of the core as indicated at 14 FIGURE 7.

As soon as this last mixture is cured the article may be removed from the mold and will have the following characteristics: the plastic surface and edges are integral, the self-bonding between both layers is perfect, the plastic is self-bonded to the core and no seam will be evident at the edges because the proportion of of pigment and other materials is the same for both layers. This article is illustrated in cross-sectional view in FIGURE 9.

Figure 8:

The second procedure to partially envelop the core is depicted in FIGURE 8. This is accomplished in one step using the total amount of mixture to which 1% methyl ethyl ketone peroxide (60%) is added, stirred and poured into the cavity or on top of the core and leveled to the edges, completely covering the top of the core and filling the cavity as indicated at 15.

After being cured and removed from the mold the article will appear to be the same as shown in FIGURE 9 in cross-sectional view. As may be seen from the foregoing, the plastic at the very bottom as shown in FIGS. 9 and 25 is at least in part thicker than the plastic layer covering the top of the core.

It should be noted that in order to avoid any bubble or entrapped air underneath the core or edge contour the pouring must be made from one side right over the cavity formed between the edge of the core and the mold walls so that the resin is permitted to flow freely into, through and around the cavity following two different paths and displacing the air until said resin completely covers the cavity to the desired level.

The article produced by the described methods will have one even plastic surface with one color, black in the example.

If a decorative effect is desired to be visible through the plastic surface, this may be accomplished by means of the following variations:

(a) Decorative effect formed in the liquid resin mixture that partially envelops the core.

(b) Decorative effect formed in at least one additional layer of liquid resin mixture formed on top of the plastic that partially envelops the core.

Figure 10:
FIGURES 10 through 12 are cross-sectional views illustrating the steps of decorating the liquid resin and enveloping the core to produce an article with one even surface.

The decorative effect can be formed in the liquid resin that partially envelops the core by means of any of the following examples:

The first example illustrated in FIGURE 10 consists in adding to a predetermined amount of liquid catalyzed resin one amount of pearl essence pigment, stirring, and pouring into the mold as described in FIGURE 8. As soon as the resin mixture covers the top surface of the core by hand means the liquid mixture is agitated in a combing motion to disperse and orient the pearl essence pigment forming a pattern of choice, suspending this combing operation as soon as the increase in the resin viscosity indicates that the gel stage is reached permitting the pattern to remain fixed into the resin.

Figure 11:

The second example illustrated in FIGURE 11 consists in pouring liquid catalyzed modified resin as indicated in FIGURE 8 and as soon as the top surface of the core is covered with resin by hand means introducing mother of pearl flakes into said liquid resin forming a desired pattern of choice before the increase in the resin viscosity indicates that the gel stage is reached and which proper timing can be controlled by means of accelerator-and-catalyst-to-resin ratios and operating temperature.

Figure 12:

The third example is illustrated in FIGURE 12 wherein by means of a fine pointed instrument that has previously been slightly impregnated or tipped with black polyester paste. Black veins are formed in the liquid catalyzed resin mixed with a pearl essence pigment to simulate a marble surface.

Whenever a deeper three-dimensional decorative effect is desired different variations may be used, by means of additional layers formed on top of the plastic that partially envelops the core. By suitable embedments either per se of in addition to the core or filler, any number of beautiful designs and decorative motifs can be had.

One of these variations consists in forming the first decorative layer in the liquid mixture that covers the top surface of the core as explained before and permitting this layer to cure, adding additional amounts of liquid resin and forming on each of these layers the desired effect or pattern, following the techniques of adding to the mixture or introducing into the mixture the decorative media as specified in the description of FIGURES 10 through 12. The only precaution is to permit each layer to harden to a certain degree before adding an additional layer of liquid resin. As noted in FIGURES 10–12 wherein a first decorative effect is formed in a mixture that covers the top of the core, a secondary decorative effect may be formed thereon as an additional layer.

Another variation consists in covering the top surface of the core with opaque pigmented liquid resin, to provide the background for the decorative effect and the masking medium for the core, forming the deep three-dimensional decorative effect in additional amounts of liquid resin poured in successive order on top of the opaque layer that covers the top surface of the core. In this variation one decorative layer if formed by means of dispersing a pearl essence pigment mixed in the resin or by means of introducing mother of pearl flakes into the resin. As stated before, the only necessary precaution is to permit each layer to harden to a certain degree before adding an additional layer of liquid resin.

Following the described procedures the finished article when removed from the mold will have one even and flat surface, its flatness depending on the viscosity of the resin or the amount of monomer or thinner used.

Sometimes in order to obtain a smoother surface this may be achieved simply by adding a small amount of melted paraffin in styrene. This surface may also be sanded, polished or buffed.

In order to produce any desired and perfect finished surface of the article, the additional steps to be followed are illustrated in FIGURES 13 through 19.

Figure 13:
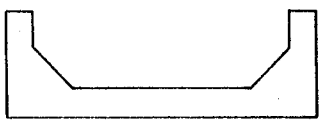
Figure 14:
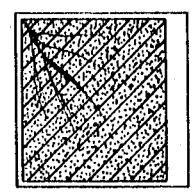

This is accomplished by means of fitting on top of the existing mold assembly, after the clamps are removed, a top cover plate the underside of which conforms to the desired exterior surface finish of the article, and a gasket to form a closed mold. This is depicted in FIGURE 13 wherein the top cover plate 18, and the gaskets 19 are in position to be fitted on top of the existing mold assembly described in FIGURE 1. In FIGURE 14 the closed mold is already formed with the clamps 5 tightly securing the top cover plate 18 and the gaskets 19 against the mold walls 4, forming a cavity 21 limited by the top surface of the last cured plastic 17, the mold walls of the existing mold 4, the gaskets 19 and the underside of the top cover plate 18. The slot 20 has previously been machined in the mold walls 4 to provide means to introduce the liquid resin into said cavity and to permit the air to escape through said opening.

Then the entire mold assembly is tilted to an appropriate position so as to permit the introduction of the liquid catalyzed resin 22 into the cavity 21 either from the top or from the bottom, as illustrated in FIGURES 15 through 18. In order to facilitate the escape of entrapped air from the cavity, the slot 20 must be properly shaped and located and also the mold assembly can be rotated.

Figure 18:
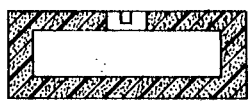
FIGURES 13 through 19 are cross-sectional views of the steps involved in order to produce an article with one finished surface.

After the cavity is filled and no air bubbles are present, the mold may be stored for cure in any desired position, one example being illustrated in FIGURE 18, but preferably in a horizontal position depicted in FIGURE 19 so as to guarantee that the liquid resin remains on the face of the top cover plate, plugging the slot by means of plug 24. This position permits better results, because this last plastic layer formed in opposite direction to the preceding layers when cured will provide isotropic properties, equal opposite stresses and an extremely hard plastic surfaces. A full description of the isotropic properties relating to cast plastic articles is found in applicant's copending application, of even date, Ser. No. 254,848, allowed Oct. 23, 1965 for issue.

Figure 20:
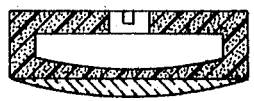
Figure 21:

In yet another embodiment of the instant invention as noted on page 4, paragraph 6 but in order to produce one desired and perfect finished surface on the article, and wherein the total amount of mixture of catalyzed polyester resin is used in one step, the procedures are shown in FIGURES 20–24. These procedures include a means of positioning a structural core 7 on the mold base 3 with means provided to secure said core thereto as shown in FIGURE 20. As illustrated, a two section core is used although it will be recognized that a core of any desired shape or form can be employed. After the core is positioned, a top cover plate 18, the underside of which conforms to the desired exterior surface finish of the article, and gaskets 19 are fitted on top of the existing mold assembly to form a closed mold as indicated in FIGURE 21.

Figure 22:
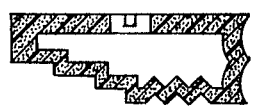

FIGURE 22 depicts the closed mold already formed with clamps 5 tightly securing the top cover plate 18 and the gaskets 19 against the mold wall 4, forming a cavity 26 limited by the core 7, the mold walls 4 of the existing mold, the gaskets 19 and the underside of the top cover plate 18. The inlet or outlet slots 20 and 23 had previously been machined in the mold base 3 to provide means to introduce the liquid resin into said cavity and to permit the air to escape through one or both of said openings.

Then the entire mold assembly is turned as illustrated in FIGURE 23 so as to permit introduction of the liquid catalyzed resin into cavity 26 as shown in FIGURE 24 with the slot 23 facilitating removal of any entrapped air from the cavity. After the cavity is filled and no air bubbles are present, the mold can be stored for curing. The article when removed from the mold will exhibit at least one perfect finished surface as indicated in FIGURE 25 wherein the core 7 is partially enveloped by plastic 27.

The article when removed from the mold will show one perfect finished surface, polished, satin, embossed, raised, sculptured, etched, irregular, etc.

The decorative effect will be visible through the plastic surface and the three-dimensional decorative effect will depend on the amount of layers used to produce said effect.

Also, the pigmented plastic portion that masks or covers the core may be totally or partially visible through the plastic surface or not, but very clearly at the edge and at a portion of the back of the article, the edge being self-formed and self-bonded and integral and unitary with the plastic surface, without seams.

Always the back side of the article will show: the portion of plastic that partially covers the core on that side and which width, thickness and shape depends on the predetermined contour of mold base and mold walls and the back contour of the core; and the portion of the core which was in tight contact with the mold base not covered by plastic.

In order to improve the appearance of the back of said article as well as to protect the core to exposure, it is possible to apply liquid pigmented catalyzed, paint or any other medium to cover this core portion.

It should be noted that different contours in the back and edges of the core as well as in the contour of the mold base and mold walls will provide different shapes to the article.

A two section core consisting of two slab cores joined together by means of nails, screws, gluing, etc., forming any desired shape; other similar kind of cores may be formed by means of three or more slabs following these principles. An article with a beveled edge can be produced from a mold of the same shape. Different variations in positioning the slab core stock into the mold to have a squared article with one, two or three self-formed edge sides, depending upon their end use which does not require four edges. In such instances, the cavity is only formed underneath the core in the selected sides, and the core requires no further machining in the other sides.

Articles produced by at least the examples stated above may have a flat surface finish; polished, satin, patterned, pyramidical, raised, engraved, and these are only basic as various effects may be used. Too, they may be convex, concave, or be irregular not only on the face but edge as well and they may have a one piece core or a two section core.

I claim:

1. A cast plastic stone appearing rigid structural surfacing ornamental slab comprising at least one lightweight partially surrounded core and a core masking cast plastic solid stone appearing body self-bonded to said core in a unitary seamless construction on a face and edge portions, said core providing structural and bulk rigidity to said structural surfacing slab, said core occupying a substantial volume of said surfacing slab and comprising an upper masked core surface, a lower completely exposed core surface defining at least a portion of one exterior face of said surfacing slab and a completely masked contour edge, said cast plastic body comprising at least one layer of a substantially rigid forming mixture of plastic material.

2. An article of claim 1 which includes the plastic material having a mottled and veined ornamental design which extends through the plastic material from the surface of the article to that portion of the material which integrally contacts the said masked core.

3. An article of claim 2 which includes a filler material in the mixture of plastic material to simulate a solid marble slab.

4. The surfacing slab of claim 1 including a preformed film adhered to at least one exterior surface of said structural surfacing slab.

5. An article of claim 1 which includes the upper plastic viewing surface being void-free and having the cast phenomena air pockets on the leading back edge surface and wherein the plastic registers a harder degree on the face than on the edge portion of the back.

6. An article of claim 1 which includes the core being made of wood particles.

7. An article of claim 1 which includes the core being made of a foamed material.

8. An article of claim 1 which includes the core being made of any combination of bulk forming materials.

9. An article of claim 1 which includes a fitting assembly centered within the completely exposed core surface.

10. An article of claim 1 which includes at least one transparent layer, a deep dimensional decorative media embedded in any one of said transparent layers, and a pigmented masking means for said core.

11. An article of claim 1 which includes the plastic material being thermosetting.

12. An article of claim 1 which includes the plastic material being thermoplastic.

13. An article of claim 1 which includes preformed elements embedded in any one of said layers.

14. An article of claim 1 which includes particles embedded in any one of said layers.

15. A cast plastic substantially rigid core interlocked structural surfacing mottled panel comprising at least one substantially rigid core material having acoustical and insulating properties and having a face and contour edge surface and a decorative media encapsulated cast plastic body partially enveloping and interlocking said core on the upper face and edge portions, said core providing the bulk to said article, said cast plastic body comprising at least one substantially rigid layer of a mixture of at least plastic material, decorative media embedded in at least one of said layers of plastic material, at least one of said layers comprising a masking means for said core, said cast plastic body fully and internally contacting the face and contoured edge surfaces of said core.

16. A seamless cast plastic simulated marble structural surfacing slab comprising at least one structural bulk providing core and a unitary solidified substantially rigid modified resinous layer masking surrounding and interlocking said core in a seamless construction on the face and contoured edge portion, and wherein the face covering registers a harder surface in any portion than that plastic material on the leading edge of the exposed core surface to a degree of between 15 and 35 percent.

References Cited

UNITED STATES PATENTS

| | | | |
|---|---|---|---|
| 2,277,752 | 3/1942 | Frey | 161—6 |
| 3,298,894 | 1/1967 | Barnette | 161—5 |

JACOB H. STEINBERG, Primary Examiner

U.S. Cl. X.R.

264—247

UNITED STATES PATENT OFFICE
CERTIFICATE OF CORRECTION

Patent No. 3,457,133                                              July 22, 1969

Stanley Ronald Barnette

Figure 16:
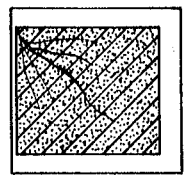
Figure 15:
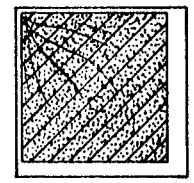
Figure 17:
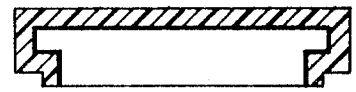

It is certified that error appears in the above identified patent and that said Letters Patent are hereby corrected as shown below:

Column 1, line 61, beginning with "FIGURES 3" cancel all to and including "may be used." in line 9, column 2, and insert instead:

FIGURE 3 is a cross-sectional view of an article produced according to this invention.
FIGURE 4 is a cross-sectional view of an article with one finished surface.
FIGURES 5 through 11 are cross-sectional views of different cores readily shaped to be partially enveloped.
FIGURE 12 is a cross-sectional view of an article having a plastic beveled edge produced in the mold illustrated in cross-sectional view in FIGURE 13.
FIGURES 14, 15 and 16 are top views of different positions of a core into the mold in order to form square articles with one, two or three integral edges at the corresponding sides.
FIGURE 17 is a cross-sectional view of an article having a special edge contour.
FIGURE 18 is a cross-sectional view of the article which corresponds to FIGURE 3 but in a similar position to FIGURE 4. This is another variation explained in paragraph 6 of page 4, upside down to produce at least one desired and perfect finished surface of the article, using the total amount of mixture in one step.
FIGURES 19, 20, 21 and 22 are cross-section views of some different shaped cores readily enveloped having different shapes and/or different surface finishes.

Figure 5:

Column 2, between lines 33 and 34, insert -- Please refer to applicant's Patent No. 3,072,973 --; line 34, cancel "FIGURE 3"; lines 35 and 36, cancel "will be illustrated step by step though the succeeding illustrations"; line 38, cancel "7 as in FIGURE 3"; line 39, cancel "8"; line 40, cancel "4"; line 41, cancel "3" and "6"; line 42, cancel "9"; line 47, cancel "10 as indicated in FIGURE 4"; line 48, cancel "11 illustrated in FIGURE 5"; line 49, cancel "12"; line 50, cancel "3"; line 53, after "core" insert -- whether wood, plywood, particle board, honeycomb, foamed plastic, composition board, plastic, or any other filler --; lines 54 and 55, "FIGURES 6 through 9" should read -- FIGURE 3 --; line 65, after "808,599" insert -- now Patent No. 3,072,973 --. Column 3, line 1, cancel "13 as depicted"; line 2, cancel "in FIGURE 6"; line 7, cancel "13"; lines 8 and 9, cancel "as indicated at 14 FIGURE 7"; line 17, "FIGURE 9" should read -- FIGURE 3 --; line 19, cancel "depicted in FIGURE 8. This is"; line 27, "9" should read -- 3 --; lines 27 to 30, cancel "As may be seen from the foregoing, the plastic at the very bottom as shown in FIGS. 9 and 25 is at least in part thicker than plastic layer covering the top of the core."; line 53, cancel "illustrated in FIGURE 10"; line 56, cancel "as described in FIGURE 8"; line 64, cancel "illustrated in FIGURE 11"; lines 65 and 66, cancel "as indicated in FIGURE 8"; line 67, cancel "hand"; lines 73 and 74, cancel "illustrated in FIGURE 12 wherein". Column 4, lines 17 and 18, cancel "as specified in the description of FIGURES 10 through 12"; line 20, cancel "As noted in FIGURES 10-12"; line 21, "wherein" should read -- Wherein --; lines 30 to 34, cancel "In this variation one decorative layer if formed by means of dispersing a pearl essence pigment mixed in the resin or by means of introducing mother of pearl flakes into the resin"; line 47, "13 through 19" should read -- 4, 18, 20 and 22 --; line 52, "FIGURE 13" should read -- FIGURE 4 --; line 53, cancel "18" and "19"; line 55, cancel "In FIGURE 14"; same line 55, "the" should read -- The --; line 56, cancel "5"; line 57, cancel "18 and the gaskets 19"; line 58, cancel "4," and "21"; line 59, cancel "17,"; line 60, cancel "4," and "19"; line 61, cancel "18" and "20"; line 62, cancel "4"; line 67, cancel "22" and "21"; lines 68 and 69, cancel ", as illustrated in FIGURES 15 through 18"; line 70, cancel "20"; line 75, cancel "one example being illustrated in FIGURE 18,". Column 5, line 1, "FIGURE 19" should read -- FIGURE 4 --; line 3, "plugging the slot by means" should read -- and plugging the slot --; line 4, cancel "of plug 24"; line 11, after "issue" insert -- as Patent No. 3,257,484 --; lines 16 and 17, cancel "are shown in FIGURES 20-24. These procedures"; line 18, cancel "7"; line 19, "3 with means provided to secure said core thereto as" should read -- with means provided to secure said core. --; lines 20 and 21, cancel "shown in FIGURE 20. As illustrated, a two section core is used although it will be recognized that"; line 21, "a" should read -- A --; line 23, cancel "18"; line 25, cancel "19"; lines 26 and 27, cancel "as indicated in FIGURE 21"; line 28, "FIGURE 22 depicts the" should read -- The --; line 29, cancel "5" and "18"; line 30, cancel "19" and "4"; line 31, cancel "26", "7" and "4"; line 32, cancel "19"; line 33, cancel "18", "20" and "23"; line 34, cancel "3"; lines 38 and 39, cancel "as illustrated in FIGURE 23"; line 40, cancel "26 as shown in FIGURE 24"; line 41, cancel "23"; lines 45 and 46, cancel "as indicated in FIGURE 25"; line 46, cancel "7"; line 47, cancel "27". Column 6, between lines 20 and 21, insert -- Refer to (application 808,599) now Patent No. 3,072,973 column 4, lines 19 through 38 entered as a permanent part of this patent. --.

Signed and sealed this 2nd day of December 1969.

(SEAL)
Attest:

EDWARD M. FLETCHER, JR.
Attesting Officer

WILLIAM E. SCHUYLER, JR.
Commissioner of Patents